United States Patent [19]

Suzuki

[11] Patent Number: 5,721,544
[45] Date of Patent: Feb. 24, 1998

[54] ENCODING METHOD

[75] Inventor: Toshihiko Suzuki, Tokyo, Japan

[73] Assignee: Canon Kabushiki Kaisha, Tokyo, Japan

[21] Appl. No.: 805,069

[22] Filed: Feb. 25, 1997

Related U.S. Application Data

[63] Continuation of Ser. No. 220,052, Mar. 30, 1994, abandoned.

[30] Foreign Application Priority Data

Mar. 31, 1993 [JP] Japan ................................. 5-096869

[51] Int. Cl.⁶ ............................................ H04N 7/00
[52] U.S. Cl. ............................................ 341/50; 348/415
[58] Field of Search ........................ 341/50, 55; 348/405, 348/415

[56] References Cited

U.S. PATENT DOCUMENTS

| | | | |
|---|---|---|---|
| 5,274,449 | 12/1993 | Keesen | 358/141 |
| 5,321,440 | 6/1994 | Yanagihara et al. | 348/408 |
| 5,432,556 | 7/1995 | Hatano | 34/415 |

*Primary Examiner*—Jeffrey A. Gaffin
*Assistant Examiner*—Peguy Jean Pierre
*Attorney, Agent, or Firm*—Fitzpatrick, Cella, Harper & Scinto

[57] ABSTRACT

In an encoding method for a system for dividing image data into blocks each consisting of a plurality of pixels, encoding the image data in units of blocks, and performing image transmission or recording of the image data, weighting coefficients for vertical/horizontal information of an image are changed in accordance with the aspect ratio information of the image data.

13 Claims, 8 Drawing Sheets

ENCODING METHOD

This application is a continuation of application Ser. No. 08/220,052 filed Mar. 30, 1994, now abandoned.

BACKGROUND OF THE INVENTION

1. Field of the Invention

The present invention relates to an encoding method and, more particularly, to an encoding method which can be suitably used in an image transmission or recording/reproduction system based on orthogonal transform encoding.

2. Related Background Art

In recent years, since digital image signals are popularly used, a high-efficiency encoding technique has become important. Since digital image data requires a considerably large frequency band than that of an analog image signal, a decrease in information amount by compression encoding is indispensable in image transmission or image recording.

Under these circumstances, block encoding for dividing image data into blocks each consisting of a plurality of pixels, and executing encoding processing in units of blocks is widely used in various application fields, and as a typical technique of the block encoding, orthogonal transform encoding is known. In particular, as orthogonal transform suitable for image information, discrete cosine transform (to be abbreviated as DCT hereinafter) is popular.

A high-efficiency encoding method using DCT will be explained below. FIG. 1 is a block diagram showing an image data compression/transmission system.

Referring to FIG. 1, input original image data 1 as (8×8 pixel) blocks in units of frames is subjected to two-dimensional DCT in a DCT circuit 52 to be converted from time-series data into frequency coordinate series data.

FIG. 2 shows a data string d after DCT. As shown in FIG. 2, the data string d consists of a DC component obtained from an average level of 64 pixels, and AC components sampled by the horizontal and vertical frequency axes.

In general, the DC component and low-frequency AC components tend to assume large values, and high-frequency AC components tend to assume small values close to 0. A quantization circuit 53 divides input data into some areas from the low-frequency side to the high-frequency side, as shown in FIG. 3.

FIG. 3 exemplifies four areas. The area of class 0 consists of horizontal and vertical low-frequency components, and the number of high-frequency components gradually increases from class 1 toward class 3. In general, the discrimination characteristics of human eyes are sensitive to low-frequency image information but are not sensitive to high-frequency image information. Therefore, when data in the low-frequency region are quantized with a small step size, and data in the high-frequency region are quantized with a large step size, a quantization distortion can be caused to concentrate on the high-frequency region, and visual deterioration of an image can be suppressed.

FIG. 3 exemplifies a case wherein data in one block are divided into four frequency areas, and tables in which the quantization step sizes increase stepwise are assigned from the low-frequency area (class 0) to the high-frequency area (class 3). The quantization step tables are generated by a quantization table generation circuit 61.

As shown in FIG. 4, a one-dimensional data string e is obtained by reading out the two-dimensional data string in turn from the low-frequency side (zigzag scanning). In the data string e, since the quantization step size for high-frequency components is large, zero components (zero run) continue. The zero components depend on the characteristics (pattern) of an image.

As shown in FIG. 1, the data string is subjected to variable length encoding by an encoding circuit 54 controlled by an encoding table generation circuit 62, and the encoded data string is converted into a predetermined rate by a buffer 55. Thereafter, the data string is output. In the variable length encoding, a small code length is assigned to a code word with high generation probability, and a large code length is assigned to a code word with low generation probability.

The buffer 55 serves to maintain a constant data rate so as to prevent encoded data from overflowing or underflowing. Decoding is a process opposite to the above-mentioned process, and encoded data from a transmission path 56 is decoded to reproduced image data 60 via a decoding circuit 57, an inverse quantization circuit 58, and an inverse DCT circuit 59.

In recent years, wide TV monitor screens have increasingly become popular. The aspect ratio of such a screen is 16:9, and the screen is wide (laterally elongated) as compared to that having an aspect ratio 4:3 of the existing TV system.

When 4:3 type image information or a signal obtained by down-converting a MUSE system signal to an NTSC signal, or 16:9 type image information such as a signal from a video camera using anamorphic lens which is optically compressed in the lateral direction is to be monitored on a wide-aspect screen via a 4:3 type transmission system, various problems are posed.

More specifically, when screen information is widened from the 4:3 transmission system to the 16:9 screen, since image expansion in the vertical direction is performed, a limitation imposed on horizontal high-frequency components in the transmission system directly appears as deterioration of image quality. As a result, a decrease in horizontal resolution, a quantization distortion over horizontal high-frequency components, and the like are undesirably monitored.

SUMMARY OF THE INVENTION

The present invention has been made in consideration of the above situation, and has as its object to provide an encoding method which allows recording/transmission of an image having an aspect ratio of 16:9 in a recording or transmission system having an aspect ratio of 4:3.

According to an aspect of the present invention, there is provided an encoding method for a system for dividing image data into blocks each consisting of a plurality of pixels, encoding the image data in units of blocks, and performing image transmission or recording of the image data, wherein weighting coefficients for vertical/horizontal information of an image are changed in accordance with aspect ratio information of the image data.

According to another aspect of the present invention, as a method of changing the weighting coefficients for vertical/horizontal information of image, horizontal frequency components are multiplied with larger weighting coefficients for orthogonal coordinate conversion than those to be multiplied with vertical frequency components.

According to still another aspect of the present invention, as another method of changing the weighting coefficients for vertical/horizontal information of image, a quantization step size for horizontal frequency components is set to be smaller than that for vertical frequency components.

According to still another aspect of the present invention, as still another method of changing the weighting coefficients for vertical/horizontal information of image, horizontal frequency components are re-sorted prior to vertical frequency components upon resorting of two-dimensionally arranged image information into one-dimensional data.

According to the present invention, before image data is encoded in units of blocks each consisting of a plurality of pixels, and is transmitted or recorded, weighting coefficients according to aspect ratio information of the image data are used in the vertical and horizontal directions of the image. Thus, when 16:9 type image transmission is performed in a recording or transmission system having an aspect ratio of 4:3, deterioration of image quality in the horizontal direction of the screen due to a decrease in horizontal resolution, a quantization distortion over horizontal high-frequency components, and the like can be suppressed.

The above and objects and features of the present invention will become apparent from the following specification.

DETAILED DESCRIPTION OF THE PREFERRED EMBODIMENT

An embodiment of an encoding method according to the present invention will be described below with reference to the accompanying drawings.

Figure 1:
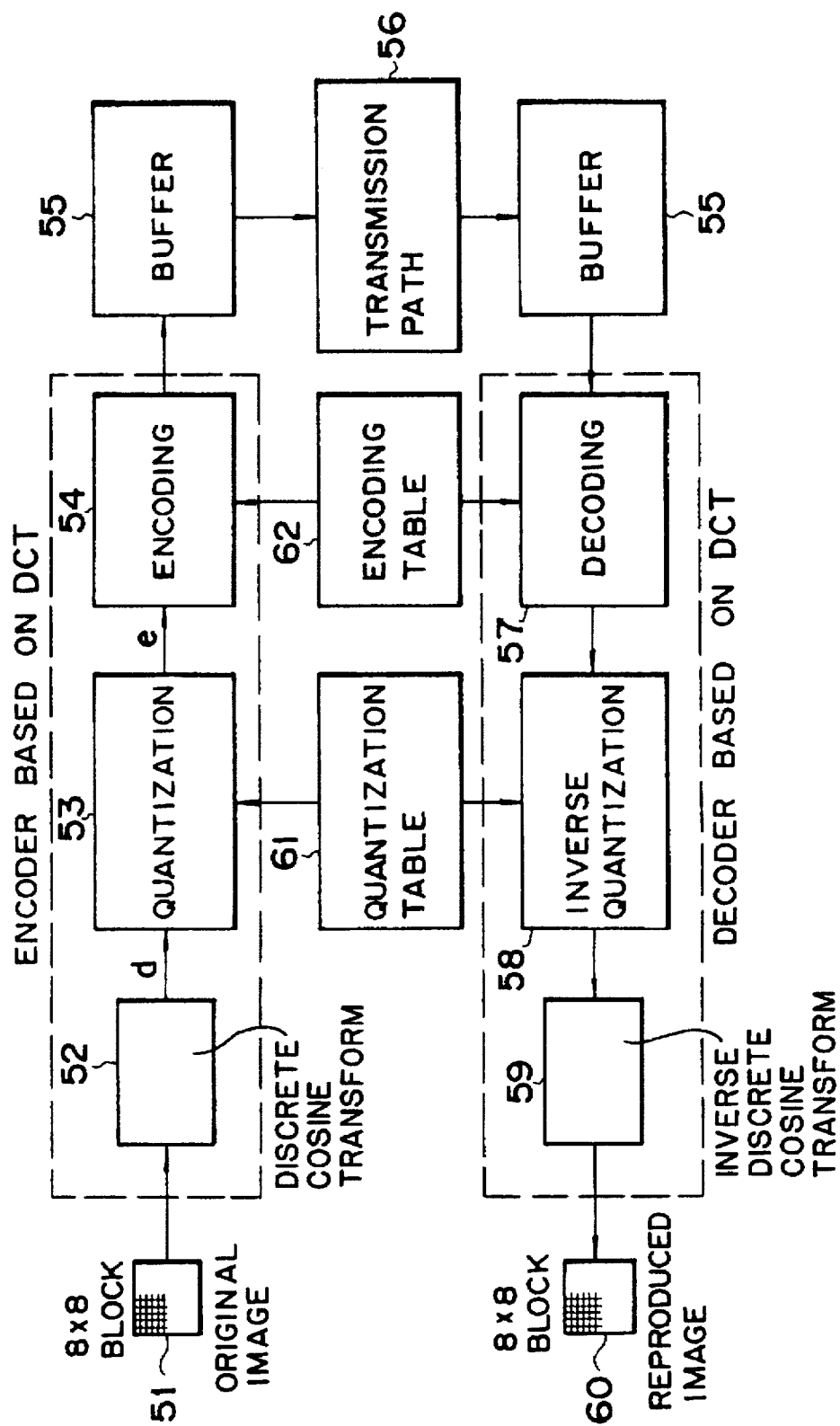
FIG. 1 is a block diagram for explaining a conventional data compression/transmission system.
Figure 2:
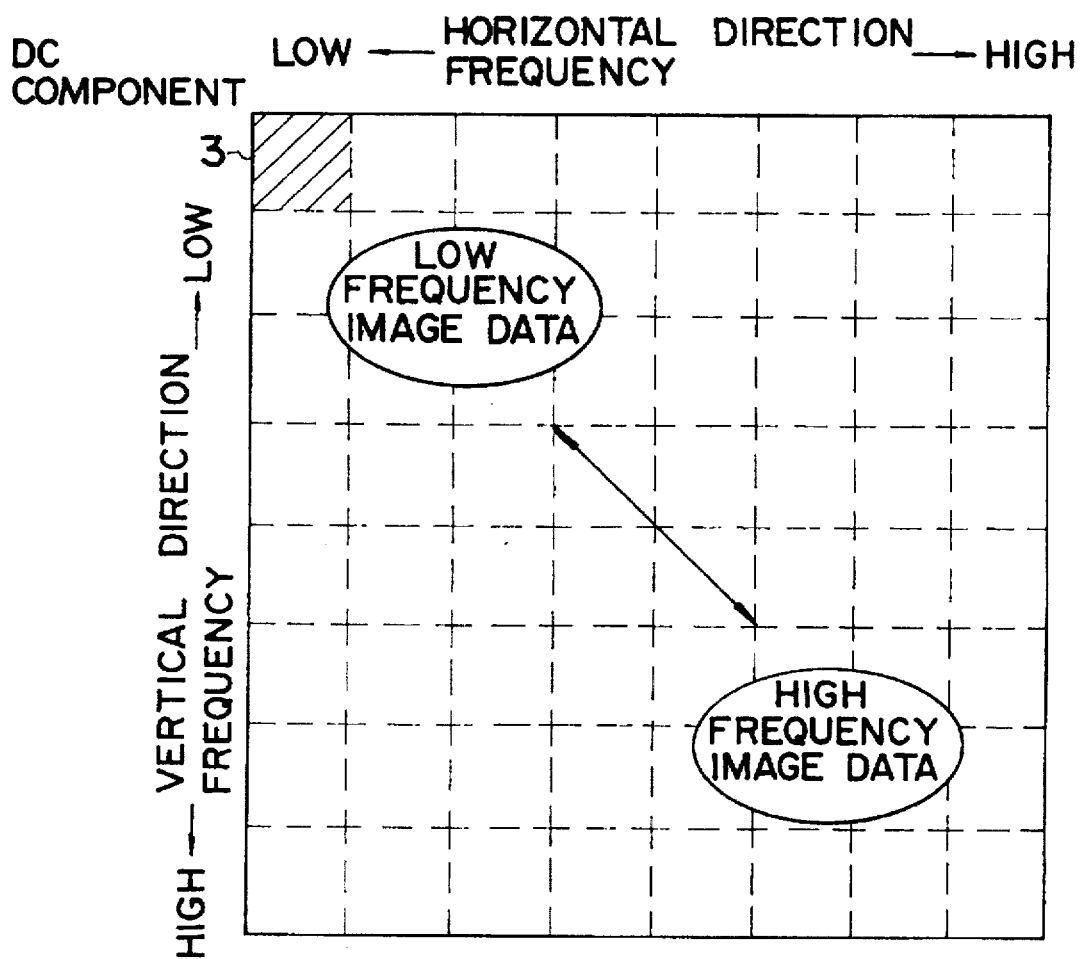
FIG. 2 is a view showing block data after DCT.
Figure 3:
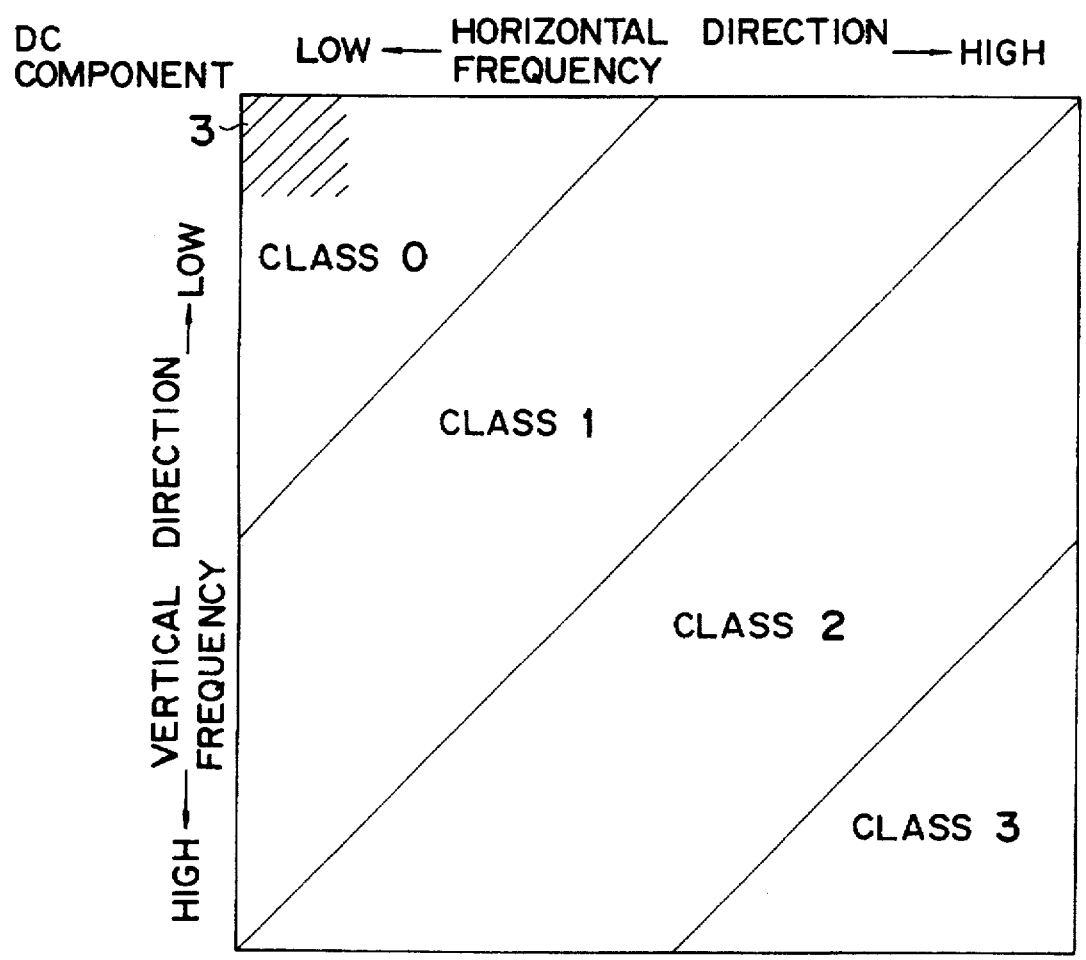
FIG. 3 is a view showing an example of divided frequency areas.
Figure 4:
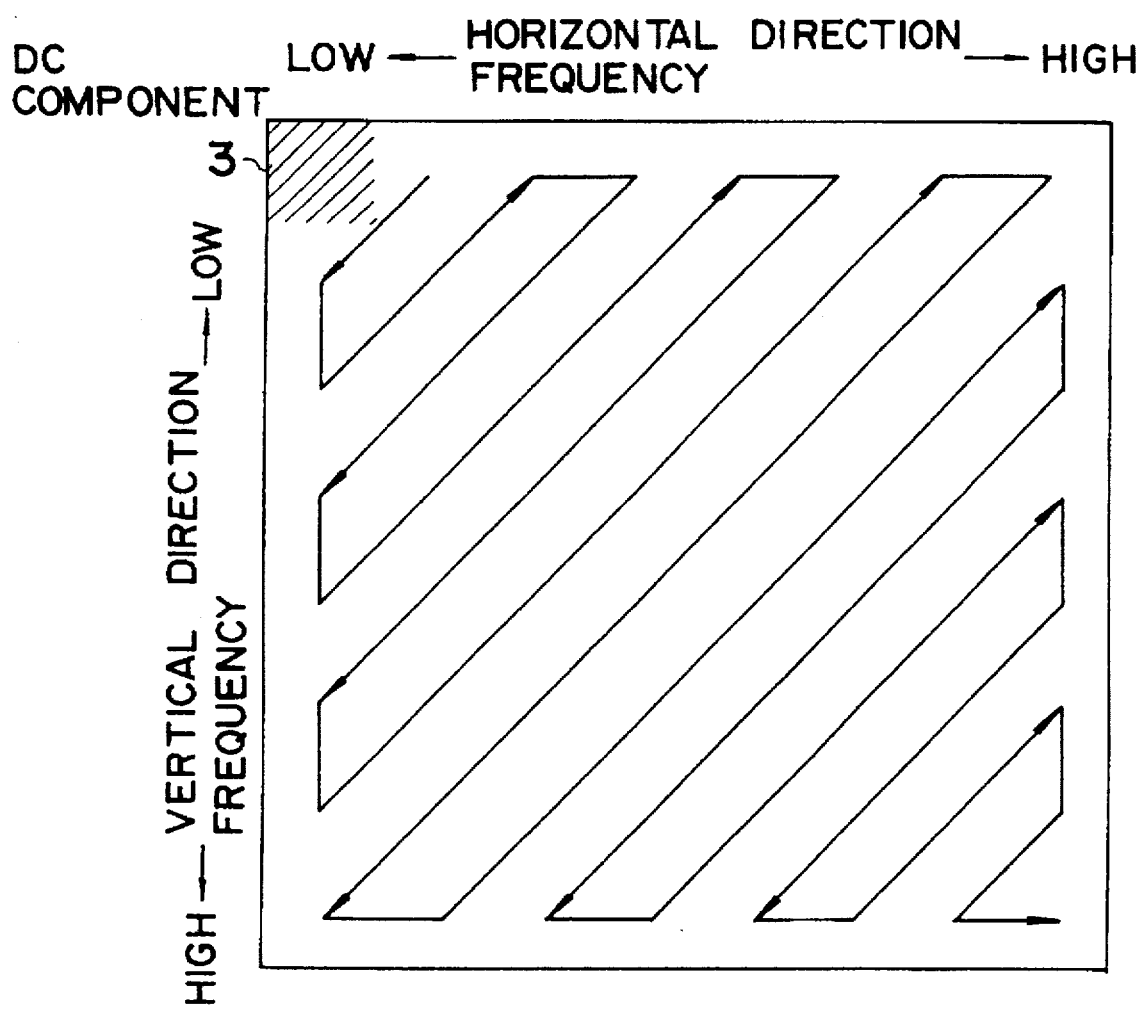
FIG. 4 is a view showing a zigzag-scanning state.
Figure 5:
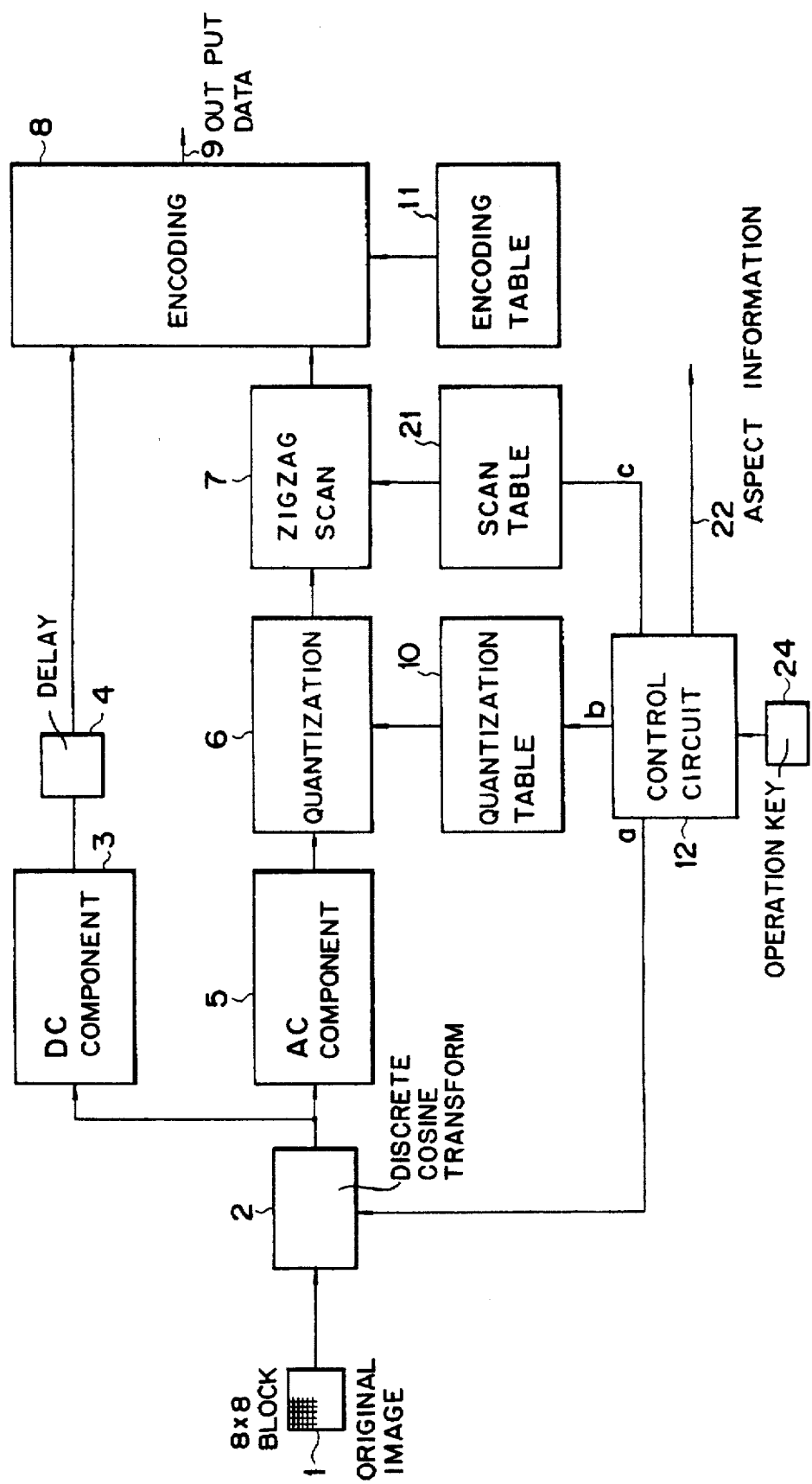
FIG. 5 is a block diagram of a data compression/transmission system for explaining an embodiment of an encoding method according to the present invention.

FIG. 5 is a block diagram showing an embodiment of an image data compression/transmission system according to the present invention.

Referring to FIG. 5, input original image data 1 is divided into (8×8 pixels) blocks in units of frames. The system shown in FIG. 5 comprises a DCT circuit 2, a circuit 3 for extracting a DC component of block encoded data, a delay circuit 4, a circuit 5 for extracting AC components of block encoded data, a quantization circuit 6, a zigzag scan circuit 7, an encoding circuit 8, a quantization table generation circuit 10, an encoding table generation circuit 11, and a control circuit 12.

In the above arrangement, as preprocessing of compression, the original image data 1 is divided into blocks each consisting of, e.g., 8×8 pixels. Then, upon execution of multiplication processing of DCT coefficients, spatial data is converted into frequency data. In this case, the control circuit 12 supplies a control signal a to the DCT circuit 2 to multiply horizontal frequency components with weighting coefficients.

Figure 6:
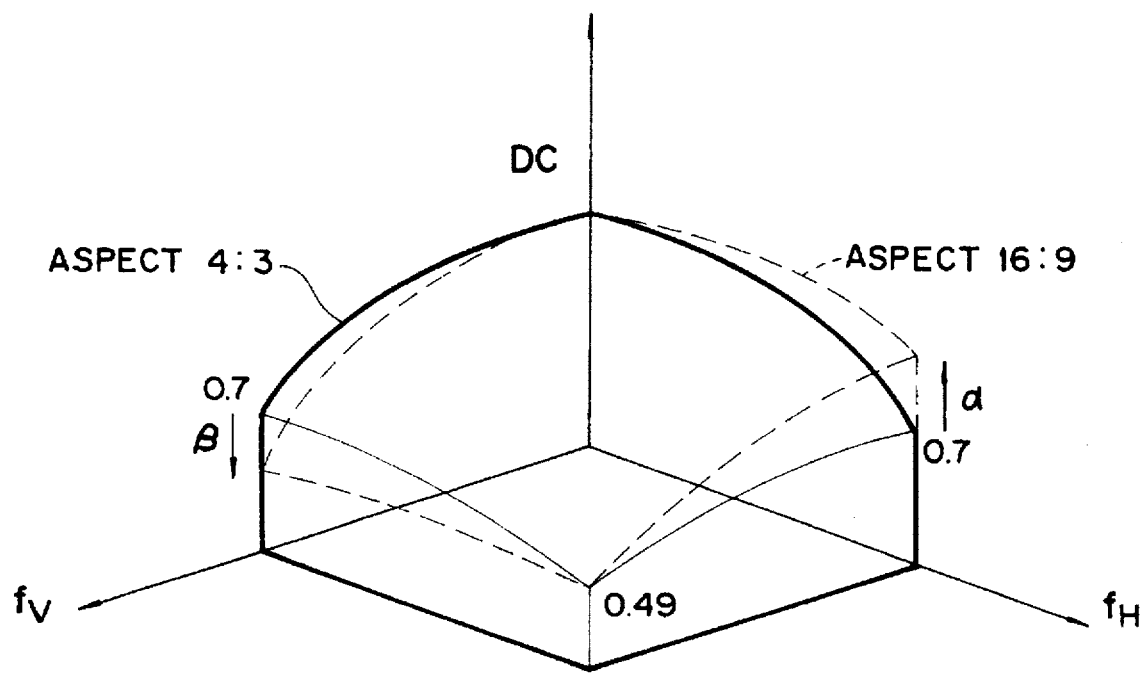
FIG. 6 is view showing a DCT weighting state.

FIG. 6 illustrates the weighting state in the DCT circuit 2. Referring to FIG. 6, in normal 4:3 type transmission, both horizontal and vertical components are multiplied with coefficients at the same ratio. However, in 16:9 transmission, a weighting coefficient $\alpha$ is added to the coefficients for the horizontal frequency components, and the weighting coefficients for the vertical frequency components are decreased by $\beta$. These coefficients $\alpha$ and $\beta$ allow to independently set horizontal and vertical weighting coefficients to DCT coefficients.

Then, encoded data after DCT is divided into a DC component 3 and AC components 5. The quantization circuit 6 compresses quantized data of the AC components 5 by dividing data coefficients in units of frequency areas with proper numerical values. The divisors are finely set in units of frequencies in the form of a table. In this embodiment, frequency area division of the quantization table generation circuit 10 can be further finely controlled by a control signal b from the control circuit 12.

Figure 7:
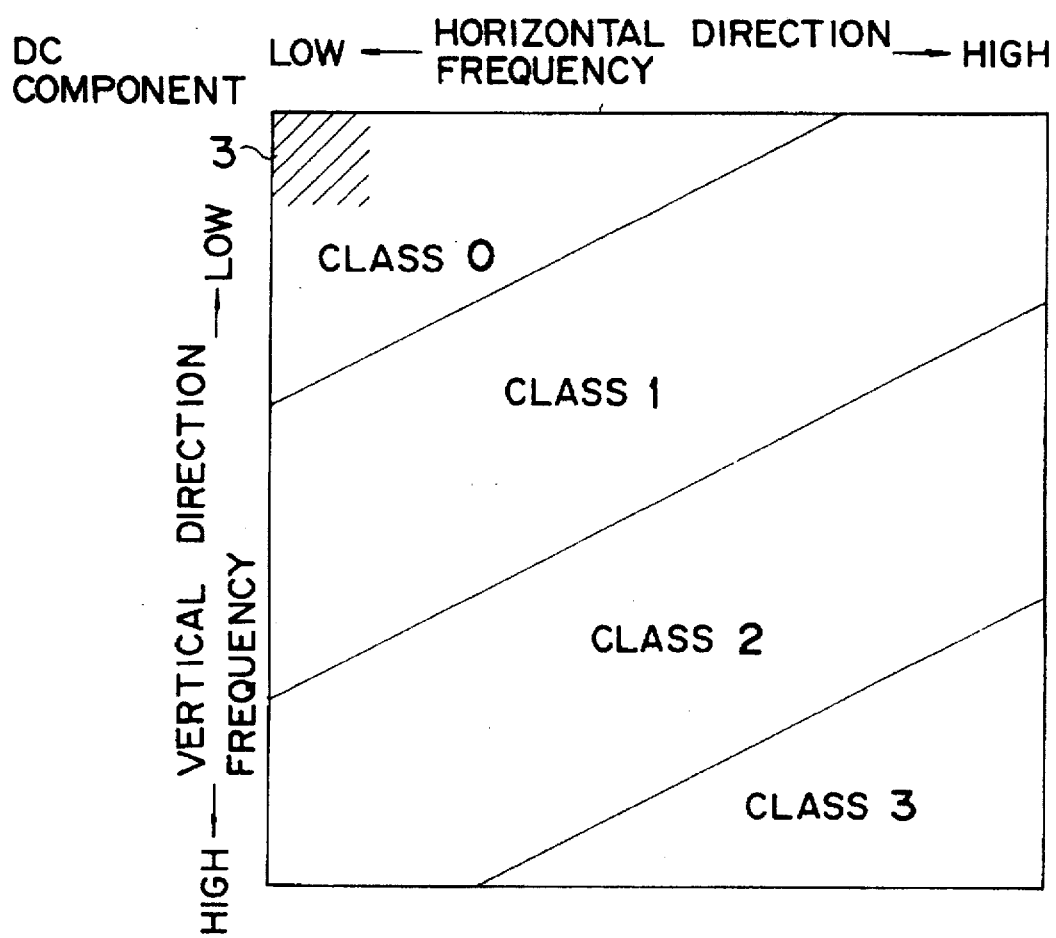
FIG. 7 is a view showing an example of divided areas corresponding to wide aspect ratio.

More specifically, as shown in FIG. 7, in a wide aspect mode, division for giving more weight on areas for horizontal components than vertical components is performed, so that the quantization step size of horizontal high-frequency components can also be finely set.

Figure 8B:
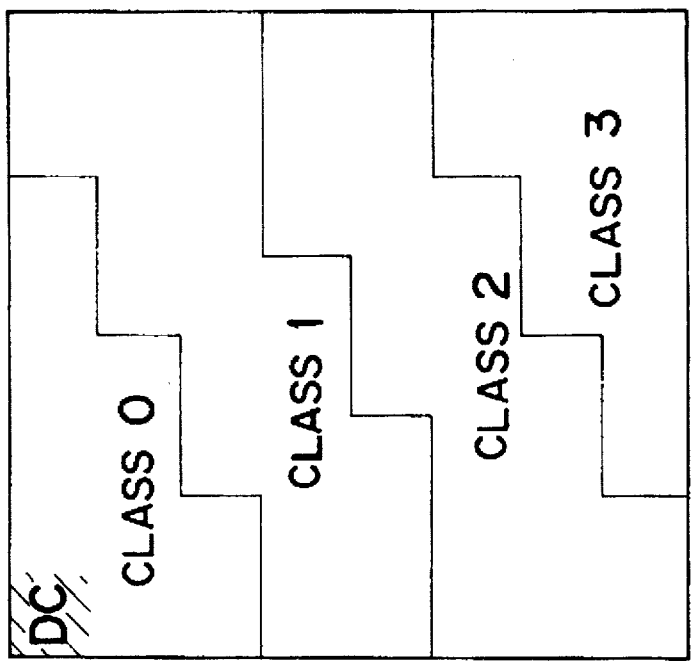
FIGS. 8A and 8B are views showing examples of four divided areas corresponding to a wide aspect ratio.
Figure 8A:
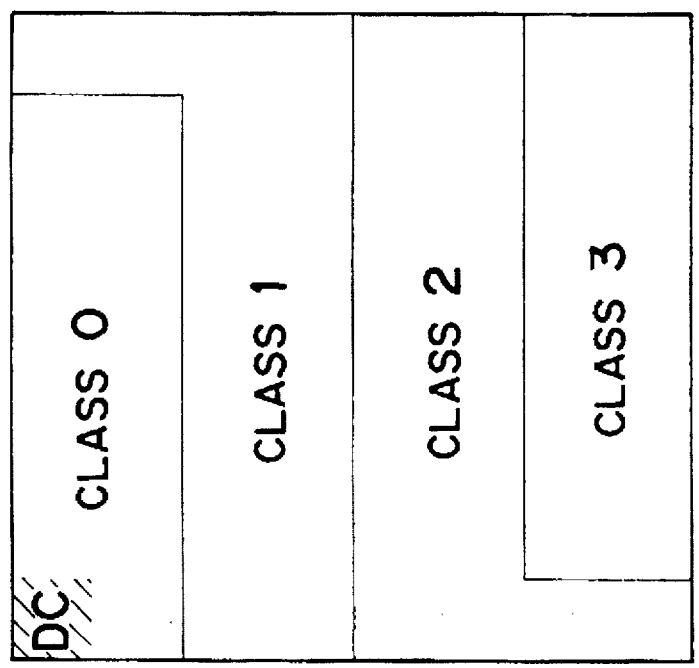

FIGS. 8A and 8B show two different examples of area division of an 8×8 pixel block in the wide aspect mode. In the above examples of area division, one block is divided into four areas. However, the number of areas to be divided is not limited to four.

Thereafter, in order to convert two-dimensionally arranged frequency coefficient data into one-dimensional data so as to assign codes having lengths according to generation frequencies of data, data are re-sorted by performing zigzag-scanning to horizontal and vertical high-frequency components using the zigzag scan circuit 7. At this time as well, in the wide aspect mode, a scan table 21 for re-sorting horizontal high-frequency components prior to those in the vertical direction in a zigzag data trace can be controlled by a control signal c.

On the other hand, the DC component is transmitted to the encoding circuit 8 via the delay circuit 4 for delaying the DC component by a time corresponding to the operation time of the processing for the AC components.

The encoding circuit 8 performs variable length encoding under the control of the encoding table generation circuit 11. In this encoding, since codes with smaller numbers of bits are assigned to numerical values with higher generation frequencies, a total number of encoded bits can be substantially reduced.

The control circuit 12 can arbitrary set a 4:3 or 16:9 transmission mode upon operation of an external operation key 24 or the like, and outputs aspect information 22 upon transmission. More specifically, a result indicating a 4:3 encoding mode or a 16:9 encoding mode is transmitted together with data.

In a decoding mode, processing is performed in a process opposite to that described above on the basis of weighting coefficients used upon encoding depending on the 4:3 or 16:9 encoding mode which can be discriminated by the aspect information 22.

As described above, according to the present invention, since weighting coefficients for vertical/horizontal information of an image are changed in accordance with aspect ratio information of the image data, horizontal frequency components of DCT or quantization coefficients, or data re-sorting coefficients are weighted in a wide aspect screen mode. Therefore, when image transmission in the 16:9 mode is performed in a recording or transmission system having an aspect ratio of 4:3, deterioration such as a decrease in horizontal resolution, a quantization distortion of horizontal high-frequency components, or the like can be satisfactorily suppressed, and high-quality image transmission can be realized.

In the above embodiment, the aspect ratios of 4:3 and 16:9 have been exemplified. However, the present invention may be applied to other aspect ratios.

Also, according to the present invention, quantization coefficients, and the like may be changed in correspondence with a broadcasting method (NTSC corresponding SD, HD, UD) or an image size in addition to a change in aspect ratio. In this case, the control circuit 12 may switch the above-mentioned quantization table, and the like in correspondence with various broadcasting methods.

What is claimed is:

1. An encoding method for a system for dividing image data into blocks each consisting of a plurality of pixels, encoding the image data in units of blocks using an orthogonal transform, wherein transform coefficients obtained by the orthogonal transform are multiplied by weighting coefficients that are changed in accordance with an aspect ratio of the image data.

2. An encoding apparatus comprising:
   (a) transform means for orthogonally transforming input image data;
   (b) means for weighting an output of said transform means by quantizing the output with the weighting coefficient; and
   (c) setting means for variably setting the weighting coefficient in accordance with an aspect ratio of the input image data.

3. An apparatus according to claim 2, wherein said setting means variably sets the weighting coefficient in accordance with a broadcasting method for obtaining the input image data.

4. An apparatus according to claim 2, wherein the weighting coefficient is variably set in correspondence with aspect ratios of 4:3 and 16:9.

5. An apparatus according to claim 4, wherein when the aspect ratio is set to be 16:9, said setting means sets a weighting coefficient for horizontal frequency components obtained by the orthogonal transform to be larger than a weighting coefficient for vertical frequency components, as compared to a case wherein the aspect ratio is 4:3.

6. An encoding apparatus comprising:
   (a) input means for inputting image data having a plurality of kinds of aspect ratios;
   (b) transform means for orthogonal-transforming the image data input by said input means; and
   (c) means for weighting an output of said transform means by multiplying the output with a weighting coefficient, said weighting means including a plurality of kinds of weighting coefficients corresponding to said plurality of kinds of aspect ratios, respectively.

7. An apparatus to claim 6, wherein said plurality of kinds of weighting coefficients are two kinds of weighting coefficients corresponding to aspect ratios of 4:3 and 16:9, respectively.

8. An apparatus according to claim 7, wherein the weighting coefficient corresponding to the aspect ratio of 16:9 is greater than the weighting coefficient corresponding to the aspect ratio of 4:3.

9. An encoding apparatus comprising:
   (a) input means for inputting sample image data having a plurality of kinds of aspect ratios;
   (b) block forming means for forming a block comprising a predetermined number of the sample image data;
   (c) transform means for orthogonal-transforming the image data on a block unit basis; and
   (d) quantization means for quantizing the image data transformed by said transform means, said quantization means quantizing the transformed image data by weighting the transformed image data according to a frequency component, and said quantization means having a plurality of kinds of weighting methods corresponding to said plurality of kinds of aspect ratios, respectively.

10. An apparatus according to claim 9, wherein said quantization means has at least two kinds of weighting methods, corresponding to aspect ratios of 4:3 and 16:9 respectively.

11. An apparatus according to claim 10, wherein in the weighting method corresponding to the aspect ratio of 16:9, said quantization means uses a quantization step for a horizontal frequency component, which is smaller than the quantization step for a horizontal frequency component, used in the weighting method corresponding to the aspect ratio of 4:3.

12. An encoding method comprising the steps of:
   (a) inputting image data having a plurality of kinds of aspect ratios;
   (b) orthogonal-transforming the image data input by said inputting step; and
   (c) weighting an output of said orthogonal-transforming step by multiplying the output with a weighting coefficient, wherein said weighting step includes a plurality of kinds of weighting coefficients corresponding to said plurality of kinds of aspect ratios, respectively.

13. An encoding method comprising the steps of:
   (a) inputting sample image data having a plurality of kinds of aspect ratios;
   (b) forming a block comprising a predetermined number of the sample image data;
   (c) orthogonal-transforming the image data on a block unit basis; and
   (d) quantizing the image data transformed in said orthogonal-transforming step, wherein the transformed image data is quantized by weighting the transformed image data according to a frequency component, and said quantizing step including a plurality of kinds of weighting methods corresponding to said plurality of kinds of aspect ratios, respectively.

* * * * *

UNITED STATES PATENT AND TRADEMARK OFFICE
CERTIFICATE OF CORRECTION

PATENT NO. : 5,721,544
DATED : February 24, 1998
INVENTOR(S) : TOSHIHIKO SUZUKI It is certified that error appears in the above-identified patent and that said Letters Patent is hereby corrected as shown below:

COLUMN 4

Line 47, "arbitrary" should read --arbitrarily--.

COLUMN 5

Line 56, "apparatus" should read --apparatus according--.

Signed and Sealed this

Eighteenth Day of August, 1998

*Attest:*

BRUCE LEHMAN

*Attesting Officer*      *Commissioner of Patents and Trademarks*